(12) United States Patent
Kimura et al.

(10) Patent No.: US 6,490,691 B1
(45) Date of Patent: Dec. 3, 2002

(54) ERROR RECOVERY IN A DISK DRIVE

(75) Inventors: Junichi Kimura, Kamakura (JP);
Satoshi Hashimoto, Yamato (JP);
Masashi Kisaka, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,236

(22) Filed: Nov. 24, 1999

(30) Foreign Application Priority Data

Nov. 26, 1998 (JP) .......................................... 10-336152

(51) Int. Cl.⁷ .............................. G06F 12/02; G11B 5/09
(52) U.S. Cl. .................. 714/8; 714/5; 714/42; 369/53.15
(58) Field of Search ................ 714/5, 8, 42; 369/53.13, 369/53.15; 360/61

(56) References Cited

U.S. PATENT DOCUMENTS

| | | | | |
|---|---|---|---|---|
| 4,796,113 A | * | 1/1989 | Hayakawa | 360/48 |
| 5,808,825 A | * | 9/1998 | Okamura | 360/69 |
| 5,818,656 A | * | 10/1998 | Klaassen et al. | 360/55 |
| 5,834,969 A | * | 11/1998 | Umeyama et al. | 327/165 |
| 5,898,532 A | * | 4/1999 | Du et al. | 360/46 |
| 5,898,535 A | * | 4/1999 | Kawai | 360/75 |
| 6,038,091 A | * | 3/2000 | Reed et al. | 360/25 |
| 6,049,763 A | * | 4/2000 | Christiansen et al. | 360/46 |
| 6,359,743 B1 | * | 3/2002 | Patti et al. | 360/25 |
| 6,384,999 B1 | * | 5/2002 | Schibilla | 360/31 |
| 6,414,806 B1 | * | 7/2002 | Gowda et al. | 360/25 |
| 2002/0075584 A1 | * | 6/2002 | Patti et al. | 360/25 |

OTHER PUBLICATIONS

Bishp et al., "A 300 Mb/s BiCMOS disk drive channel with adaptive analog equalizer", Solid–State Circuits Conference, 1999. Digest of Technical Papers. ISSCC. 1999 IEEE International, pp.: 46–47.*

* cited by examiner

*Primary Examiner*—Robert Beausoleil
*Assistant Examiner*—Gabriel L. Chu
(74) *Attorney, Agent, or Firm*—G. Marlin Knight

(57) ABSTRACT

A disk drive with the ability to detect errors caused by thermal asperities and assign alternate sectors is described. One of a plurality of error recovery procedures is executed after turning off a signal filter which normally removes a set of low frequencies from the output signal from the head. The unfiltered signal is used to judge whether a thermal asperity caused the error. If it is determined that a thermal asperity caused the error, the sector is marked as defective and an alternate sector is assigned even if other error recovery procedures are able to read the sector. The reliability of the drive is enhanced by removal of sectors from use which have temporarily recoverable errors caused by thermal asperities.

8 Claims, 4 Drawing Sheets

| LBA | 0000 | 0001 | 0002 | 0003 | ------- |
|---|---|---|---|---|---|
| PHS$_N$ | 0000 | 0001 | 0003 | 0004 | ------- |

| LBA | SPARE | CAN | RE | WE | TA |
|---|---|---|---|---|---|
| 001FB770 | 0000 | 0 | 0 | 1 | 0 |
| 001FB771 | 0001 | 0 | 1 | 0 | 0 |
| 001FB772 | 0002 | 0 | 0 | 1 | 0 |
| 001FB773 | 0003 | 0 | 0 | 1 | 1 |
| 003DA124 | 0004 | 0 | 0 | 1 | 0 |

ERROR RECOVERY IN A DISK DRIVE

FIELD OF THE INVENTION

The present invention relates to a disk drive with enhanced reliability resulting from improved error recovery procedures.

DESCRIPTION OF RELATED ART

A disk drive using a magnetic disk as a recording medium utilizes a head to read and write data from/on a magnetic disk. The actual transducer elements which are referred to as the head(s) are disposed in a slider which has an air bearing surface facing the magnetic disk. The slider is provided at an end of the head arm, which is rotated by a rotary actuator to move the head slider in an approximately radial direction of the magnetic disk.

Further, an elastic member disposed on the head arm exerts a force on the slider toward the magnetic disk. If air flows between the head slider and the magnetic disk as the magnetic disk rotates, the slider flies up from a surface of the magnetic disk against the force exerted by the elastic member. The spacing between the magnetic disk and the head slider is determined on the basis of various conditions including the relative speed of the air bearing face and the magnetic disk.

A surface of a magnetic disk may have some unwanted projections (asperities), for example, due to reduced precision in manufacturing.

When the head hits a projection of the magnetic disk, the head is abruptly heated as a result of frictional heating or the like. This is called a thermal asperity. Especially in a head using a magnetoresistive (MR) element or a giant magnetoresistive (GMR) element, an increase in head temperature will lead to a great change in a read signal, significantly degrading the read/write reliability and, in some cases, making it impossible to read/write data from/on the magnetic disk.

As the recording density is increased, the distance between the recording surface and the head is decreased. Thus, the possibility that the head will strike such microscopic projections increases.

Some conventional disk drives take measures such as correcting variations in a head output due to variations in temperature utilizing the direct-current component of the read output of the head or the like or reducing the low-frequency component of the read output of the head, so that the influence of a thermal asperity is lowered to allow normal reading and writing.

Since a particular thermal asperity may grow with the passage of time, it may not be desirable to continue using a sector on the disk having a thermal asperity for reliability.

The conventional disk drive also takes measures to reduce the effect of a thermal asperity in service, but does not take any positive measures to detect thermal asperities. Such apparatus is susceptible of improvement in terms of reliability.

SUMMARY OF THE INVENTION

To solve the above problem, a disk drive according to the present invention has recording medium; at least one head for reading information from said recording medium; a signal filter for filtering a selected set of frequencies from an output from the head when the signal filter is turned on; switching means for the signal filter which allows the signal filter to be turned off or on; an error detection means for detecting an error occurring in a first region when read by the head with the signal filter turned on; and an error processing means for executing a plurality of error recovery procedures when an error is detected by said error detection means, one of the error recovery procedures including thermal asperity detection by turning off the signal filter and using a signal from the head which has not been filtered by the signal filter to determine whether the error is caused by a thermal asperity, and if the error is caused by a thermal asperity, assigning an alternate region for first region.

Further, the recovery means may include a position detection means for detecting a position of the error; and the error processing means may register the region in which the error occurs as the defective region when errors are repeatedly detected on the basis of a detection signal output from the position detection means for a predetermined number of times in the same position.

Furthermore, a method of executing an error recovery procedure in a disk drive according to the present invention comprises the steps of: detecting an error occurring in reading a first region with a head while a signal filter is turned on and filters a selected set of frequencies from an output from the head; rereading the first region with the signal filter switched off and using an unfiltered signal from the head to judge whether the error is caused by a thermal asperity; and if the error is caused by a thermal asperity, assigning an alternate region for first region. The method may also include rereading the first region a plurality of times while counting errors occurring at each position in the region; and if a count of errors at any single position exceeds a selected threshold, flagging the first region as having a thermal asperity.

DETAILED DESCRIPTION OF THE INVENTION

Figure 1:
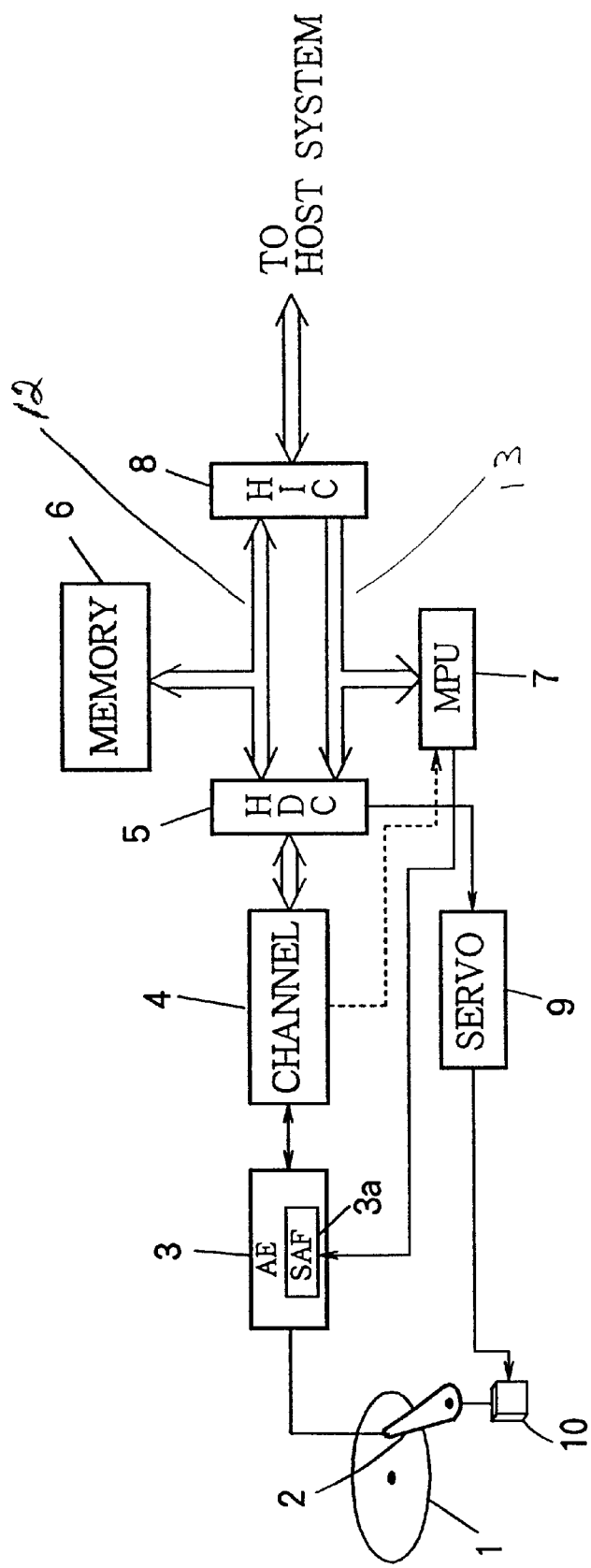
FIG. 1 is a block diagram showing the configuration of a disk drive apparatus of an embodiment of the present invention.

FIG. 1 is a block diagram showing the configuration of the disk drive apparatus of an embodiment of the present invention. The disk drive apparatus has a magnetic disk 1 on which data is recorded, a head 2 in a slider for reading/writing information from/into the magnetic disk 1, and an arm electronic circuit (arm electronics: AE) 3 for supplying a write signal to the head 2, amplifying the read output of the head 2, and performing other processing. The disk drive apparatus also has a channel 4 for converting an analog signal to digital data and vice versa, and a hard disk controller (HDC) 5 for performing data reading and writing, servo data computations, and other processing. This disk drive apparatus further has a memory 6 used, for instance, to cache read/write data and to store a controlling program, an MPU 7 for performing exception handling and the like, an interface (host interface controller: HIC) 8 for controlling input from and output to external information processing apparatus (host system) or the like, a servo system 9 for generating a servo control signal according to the servo data from the HDC, a head drive mechanism (rotary actuator) 10 for moving the head 2 in an approximately radial direction of the magnetic disk 1, as controlled by the servo system 9, and so on.

The HDC 5, the memory 6, and the HIC 8 are connected by a data bus y1 12 while the HDC 5, the MPU 7, and the HIC 8 are connected by a control bus y2 13.

Figures 2, 3, 4:
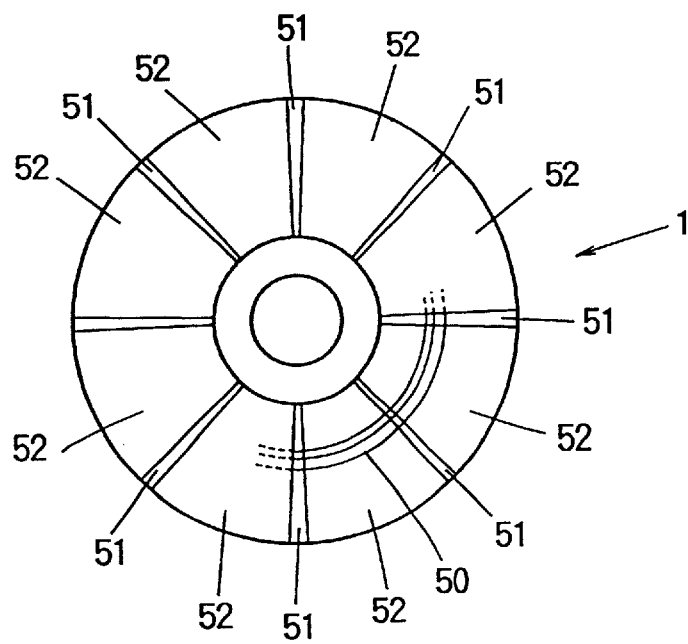
FIG. 2 is a diagram showing a recording format on a magnetic disk used as a record medium of the disk drive apparatus.
FIG. 3 is a diagram showing a conversion table indicating the correspondence between the logical block addresses (LBAs) supplied by the host system and data sectors.
FIG. 4 is a diagram showing a sample of a reassignment table.

A recording surface of the magnetic disk 1 has a number of recording tracks 50 formed in a radial direction, for instance, as shown in FIG. 2. The recording tracks 50 have servo regions 51 in which servo sector information is recorded and data regions 52 in which data sectors are recorded, provided at intervals of certain angles (360°/66, for instance).

The servo sector information includes a burst pattern used for positioning, information for identifying each track (cylinder ID), information for identifying each servo sector (physical sector number: PHSN), and the like. The data region 52 holds data sectors the number of which depends on their radial positions and the like, and data is read and written in units of data sectors.

The head 2 includes a write head of inductance type, for instance, and a read head utilizing a magnetoresistive (MR) element or a giant magnetoresistive (GMR) element, for instance.

The recording surface of the magnetic disk 1 may have some projections (asperities) formed due to reduced precision in manufacturing or the like. If the head 2 hits a projection, the head is abruptly heated as a result of frictional heating or the like. This causes a great change in a read signal, significantly degrading the read/write reliability and, in some cases making it impossible to read/write data from/on the magnetic disk.

To solve the above problem, the AE 3 has a signal adaptive filter (SAF) 3a comprising a high-pass filter (HPF) for passing just the high-frequency component of the read output of the head 2. The SAF 3a is provided to reduce the effect of a thermal asperity (TA) by eliminating the low-frequency component from the read output of the head 2, for instance. The SAF 3a can be turned on or off as controlled by the MPU 7.

The SAF 3a may correct the read output of the head 2 according to the direct-current component of the read output of the head 2 instead of eliminating the low-frequency component from the read output of the head 2.

The channel 4 detects the read level of the servo burst pattern mentioned above and converts it into digital data, and supplies the result to the HDC 5. The channel 4 also reproduces the cylinder ID and PHSN recorded in a servo sector, and the data recorded in a data sector, and supplies the reproduced information to the HDC 5.

The HDC 5 detects the current position of the head 2 according to the burst pattern read level, cylinder ID, PHSN, and other information supplied from the channel 4 and performs servo data computations and other processing according to instructions and the like from the MPU 7.

The memory 6 has a region for storing data to be read or written, the control program of the MPU 7, data (reassign table, for instance,), and the like, and a buffer region for storing read/write data. The buffer region has a data holding capacity of more than several hundreds of recording units (data sectors) on the magnetic disk 1, for instance.

The MPU 7 is designed to execute multiple processes in parallel and executes exception handling and other processing that cannot be done by the HDC 5.

The HIC 8 is connected to the memory 2 via the data bus y1 12 and controls command input/output from/to the host system and data input/output through the memory 2, and the like.

When a command is supplied through the HIC 8 from the host system, the HDC 5, the memory 6, and the MPU 7 finds a sector corresponding to the logical block address (LBA) specified in the command, based on the LBA.

To be more specific, the HDC 5, the memory 6, and MPU 7 converts the LBA given by the host system into a data sector, using a conversion table indicating the correspondence between the individual LBAs and data sectors, as shown in FIG. 3, for instance.

After finding the data sector, the HDC 5, the memory 6, and the MPU 7 finds a track in which the data sector is recorded, physical sector number, and the like, and performs seek control to move the head 2 to the corresponding track (target track).

The HDC 5 obtains the current position of the head 2, as described above, and also obtains the servo data corresponding to the position error from the target track, and supplies the data to the servo system 9. The servo system 9 supplies the servo data to the rotary actuator 10. Through these operations, the head 2 moves to the target track.

When the head 2 moves to the target track, the HDC 5 performs track following control to keep the head 2 over the target track.

In this state, the timing at which the head 2 reaches the target sector is detected according to the PHSN and the like from the channel 4, and data read/write is executed. The data is read from or written into the sector corresponding to the LBA.

While the disk drive apparatus is in service, an region which cannot be normally read or written (error region) may be formed on the recording surface of the magnetic disk 1. Accordingly, a spare region is provided beforehand on the recording surface, and if an error region is found, a data sector in the spare region (spare sector such as a data sector on the radially innermost track) is assigned instead of the data sector in the error region. By using such measures, the host system can read or write data somewhat as if no error occurred.

This reassignment of spare sectors is managed on the basis of the reassign table, as shown in FIG. 4, for instance. The reassignment table includes the addresses of data sectors to which spare sectors are assigned (LBAs), numbers of assigned spare sectors (SPARE) (relatively represented by a pointer from a reference address), and flags indicating the status in which the error occurred (CAN, RE (error occurred in reading), WE (error occurred in writing), TA (error caused by thermal asperity)), as shown in the FIG. 4. The reassignment table is recorded in a predetermined region or the like on the magnetic disk 1, for instance, and is written into the memory 6 when the apparatus operates.

When the host system supplies a command including an address (LBA), a read/write instruction is given to the HDC 5 or MPU 7. Then, the HDC 5, the memory 6, and the MPU 7 first references the reassign table to check whether a spare sector is assigned to the data sector corresponding to the specified LBA. If no spare sector is assigned, the HDC 5, the memory 6, and the MPU 7 obtains the physical sector number of the data sector corresponding to the specified LBA with reference to the conversion table, as shown in FIG. 3, and starts a read/write operation for the data sector corresponding to the physical sector number.

On the other hand, if a spare sector is assigned to the data sector corresponding to the specified LBA, the HDC 5, the memory 6, and the MPU 7 starts a read/write operation for the assigned spare sector.

When reading or writing is performed, the channel 4 detects whether the reading or writing for the magnetic disk 1 terminates normally and supplies the detection result to the MPU 7.

If the detection result indicates that the reading or writing has failed (does not terminate normally), the MPU 7 follows an error recovery procedure (ERP).

In the ERP, the MPU 7 makes several read/write attempts while controlling the servo system 9 to vary the read/write position of the head 2 from the reference position or controlling the AE 3 or channel 4 mentioned above to change the filter characteristics and other read/write parameters. If one of the read/write attempts is successful, the MPU 7 exits from the ERP. If a predetermined number of read/write attempts end in failure, the corresponding data sector is added to the reassign table, as shown in FIG. 4, as a defective sector, and a spare sector is assigned instead.

Figure 5A:
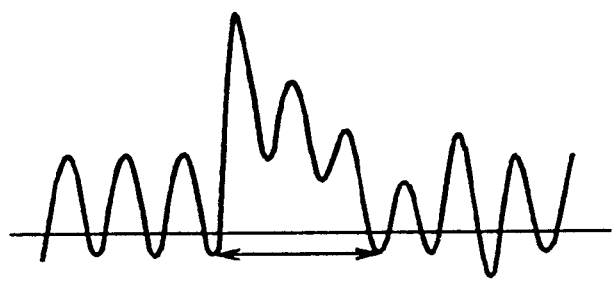
FIGS. 5A and 5B show wave forms of a sample of the read wave form while the SAF is disabled.
Figure 6A:
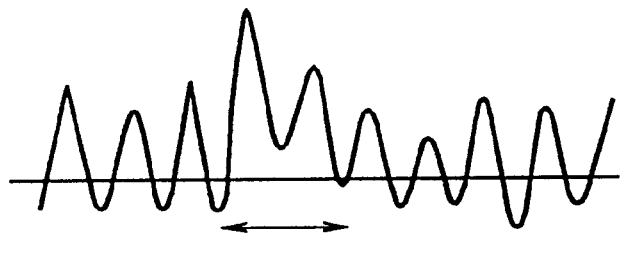
FIGS. 6A and 6B show wave forms of a sample of the read wave form while the SAF is enabled.

As described above, the AE 3 has the SAF 3*a* provided to reduce the effect of the TA. If the TA occurs, the read wave form of the head 2 changes as shown in FIG. 5A. If the SAF 3*a* eliminates the low-frequency component, the wave form changes as shown in FIG. 6A, and the recorded data can be correctly read. The horizontal straight lines in FIG. 5A and FIG. 6A are thresholds for detecting the TA.

An error caused by the TA is characterized by the fact that no clock is reproduced for a relatively long period of about 6 clocks (1 clock corresponds to a half cycle of the high-frequency component in FIG. 5A), for instance and that the error repeatedly occurs in the same position.

Figure 5B:
Figure 6B:

If the read wave form keeps staying on either side of the threshold mentioned above for a period of a selected number of clocks (6 clocks, for instance) or longer, it is judged that the TA has occurred. The TA is detected by holding the detection output (FIG. 5B, FIG. 6B) high for a certain period of time. The threshold and the selected number of clocks should be set to such values that the TA detection sensitivity would not be too high nor too low.

The TA may grow with the passage of time, and it is recommended that a data sector having the TA is positively added to the reassign table as shown in FIG. 4, as a defective sector and the defective sector is skipped over by the head in order to improve the reliability.

The conventional disk drive apparatus, however, has taken measures to reduce the effect of the TA, and it has been difficult to detect whether the error is caused by the TA, which can be clearly understood by comparing FIG. 5A and FIG. 6A.

On the other hand, the disk drive apparatus of the present invention is configured so that the operation of the SAF 3*a* can be controlled from the MPU 7, and the ERP described above includes a step of disabling the SAF 3*a* in order to positively detect the TA. So, if the TA occurs, the read wave form appears as shown in FIG. 5A, and accordingly the TA can be easily detected.

Figure 7:
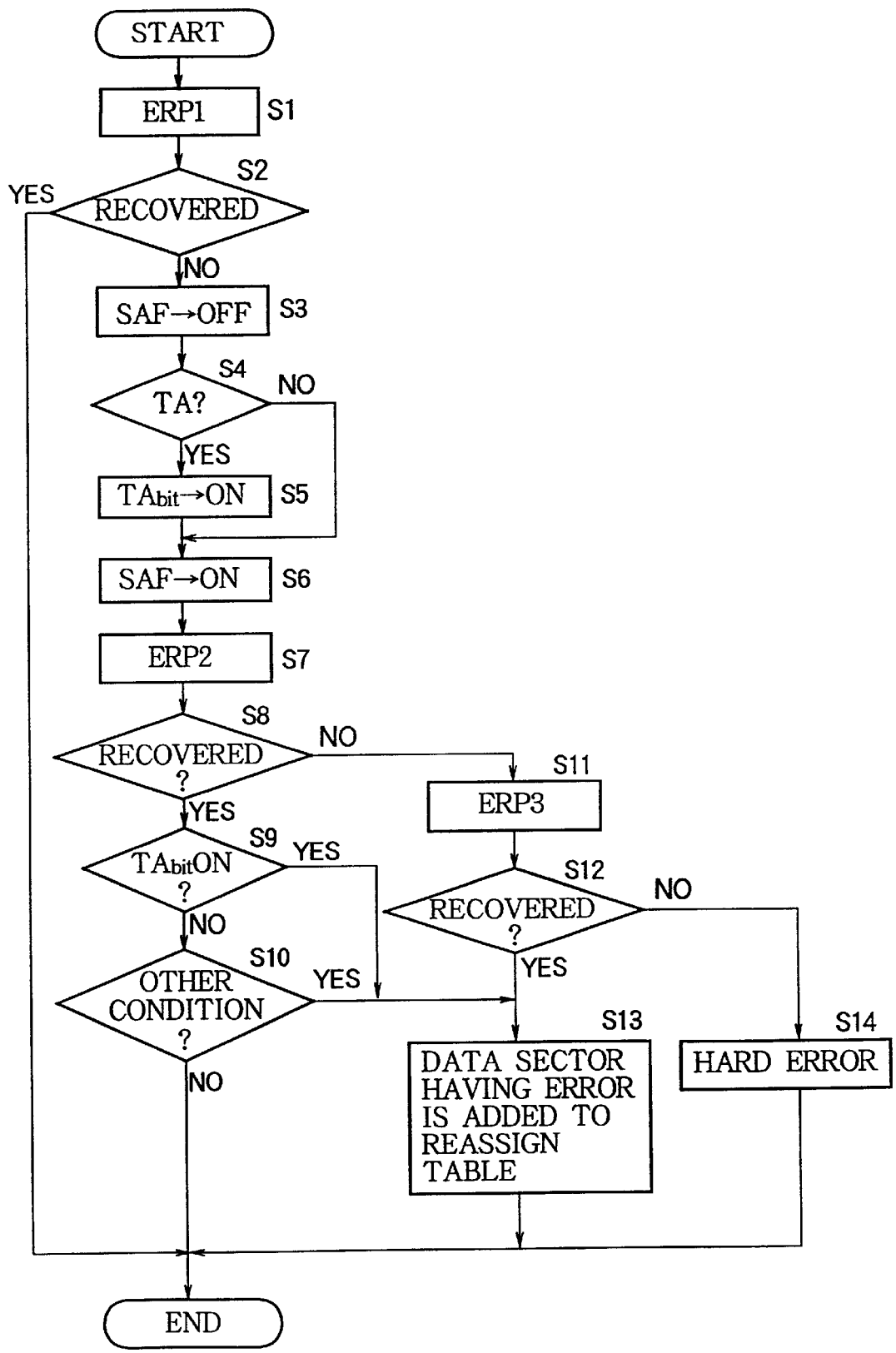
FIG. 7 is a flow chart showing procedure of the ERP.

FIG. 7 is a flow chart showing the concept of the processing of the ERP described above.

If an error in reading or writing is detected by the channel 4, as described above, the processing starts from step S1.

In the initial state, the SAF 3*a* is enabled. In step S1, the MPU 7 executes a given procedure, the ERP (ERP1), and the processing proceeds to step S2.

In step S2, whether the error is recovered is determined. If the error is recovered, the ERP terminates. If not, the processing proceeds to step S3.

In the ERP (ERP1), steps S1 and S2 are repeatedly executed for each step, or a single operation such as reading and writing which has caused a read/write parameter to change, but for clarity this is not shown in FIG. 7. If the error is corrected, the ERP terminates in step S2. If the error is not corrected after all steps are handled, the processing proceeds to step S3.

In step S3, the MPU 7 disables the SAF 3*a* and goes to step S4.

In step S4, whether the error is caused by TA is checked. To be more specific, whether the read output varies across the threshold within a period of a predetermined number of clocks is checked, for instance, as described earlier.

If the error is caused by the TA, the TA bit is turned on in step S5, then the processing proceeds to step S6. If the error is not caused by the TA, the processing directly proceeds to step S6.

In step S6, the MPU 7 enables the SAF 3*a* and goes to step 7.

In step S7, the MPU 7 executes the EPR (ERP2), which is more powerful than the ERP1 described earlier, and the processing proceeds to step S8.

In step S8, whether the error is recovered in the ERP (ERP2) is checked. If the error is not recovered, the processing proceeds to step S11. If the error is recovered, the processing proceeds to step S9.

In step S9, the MPU 7 checks whether the TA bit is set on. If the TA bit is on, the processing proceeds to step S13. If the TA bit is not on, the processing proceeds to step S10.

In step S10, the MPU 7 checks whether other reassign conditions such as the number of steps handled in the ERP are satisfied. If a condition is satisfied, the processing proceeds to step S13. If no condition is satisfied, it is judged that the reassignment is not necessary, and the ERP terminates.

In step S11, the EPR (ERP3), which is further more powerful than the ERP2 described above, is followed. Then, the processing proceeds to step S12.

In step S12, whether the error is recovered in the ERP (ERP3) is checked. If the error is recovered, the processing proceeds to step S13.

In step S13, the data sector having the error, for which the ERP is executed, is added to the reassign table as shown in FIG. 4, a spare sector is assigned, and the ERP terminates.

If the error is not corrected, the processing proceeds to step S14. The occurrence of a hard error is reported, and the ERP terminates.

The disk drive apparatus of the present invention can easily detect the thermal asperity by adding a step of disabling the SAF 3*a* which corrects the read output of the head 2 during the error recovery procedure, as described above. Accordingly, a data sector having the thermal asperity can be specified as a defective sector with higher certainty, contributing to enhanced reliability of the disk drive apparatus.

The disk drive apparatus adds an error correction code (ECC) to the data recorded in the data sector mentioned above. If the number of errors does not exceed a predetermined byte count, the errors can be located by means of the ECC.

For example, the data of 512 bytes per sector is given parity bits (ECC symbols) of 10 bytes per interleave, or 30 bytes per sector through three-way interleaving (the method of dividing the data of a single sector into three parts (interleaves) from the beginning and obtaining a parity for each interleave). With these ECCs added, errors of up to 5 bytes per interleave or up to 15 bytes per sector, for instance, can be located, depending on the way in which the parities are obtained.

Therefore, the MPU 7 may detect the position of an error in each routine or retry during the ERP described above, count the number of errors in each position, and judge in step S4 mentioned above that the error is caused by the TA if the number of errors counted in one position exceeds a selected threshold.

Through this judgment, so-called overkill, or false recognition of the TA can be avoided and spare sectors will not be wasted. These false recognitions may occur, for instance, when the read head is unstable immediately after writing.

The present invention should not be limited to the embodiment described above and should be susceptible of various changes without departing from the spirit and scope of the present invention.

What is claimed is:

1. A disk drive comprising:
    a recording medium;
    at least one head for reading information from said recording medium;
    a signal filter for filtering a selected set of frequencies from an output from the head when the signal filter is turned on;
    switching means for the signal filter which allows the signal filter to be turned off or on;
    an error detection means for detecting an error occurring in a first region when read by the head with the signal filter turned on; and
    an error processing means for executing a plurality of error recovery procedures when an error is detected by said error detection means, one of the error recovery procedures including thermal asperity detection by turning off the signal filter and using a signal from the head which has not been filtered by the signal filter to determine whether the error is caused by a thermal asperity, and if the error is caused by a thermal asperity, assigning an alternate region for first region.

2. The disk drive of claim 1, the error processing means further comprising:
    means for reading the first region a plurality of times;
    position detection means for detecting positions of errors inside the first region each time the first region is read;
    means for flagging the first region as having a thermal asperity if a count of errors occurring at a single position exceeds a selected threshold.

3. The disk drive of claim 1 wherein said selected set of frequencies are a low frequency band.

4. The disk drive of claim 1 wherein:
    said error processing means judges that an error is not corrected if the output by said at least one hand continues exceeding a predetermined level for a predetermined period of time.

5. A method of executing an error recovery procedure in a disk drive comprising the steps of:
    detecting an error occurring in reading a first region with a head while a signal filter is turned on and filters a selected set of frequencies from an output from the head;
    rereading the first region with the signal filter switched off and using an unfiltered signal from the head to judge whether the error is caused by a thermal asperity; and
    if the error is caused by a thermal asperity, assigning an alternate region for first region.

6. The method of claim 5, further comprising the steps of:
    rereading the first region a plurality of times while counting errors occurring at each position in the region; and
    if a count of errors at any single position exceeds a selected threshold, flagging the first region as having a thermal asperity.

7. The method of claim 5 wherein said selected set of frequencies are a low frequency band.

8. The method of claim 5 further comprising the step of judging that an error is not corrected if the signal exceeds a predetermined level for a predetermined period of time.

* * * * *